C. P. BYRNES.
VACUUM BOTTLE.
APPLICATION FILED MAY 15, 1912.
1,130,255.
Patented Mar. 2, 1915.
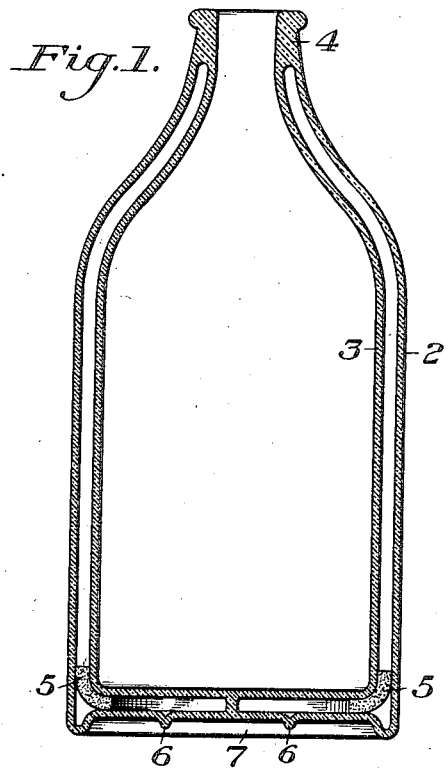
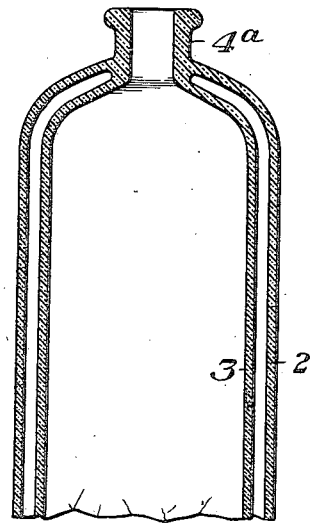
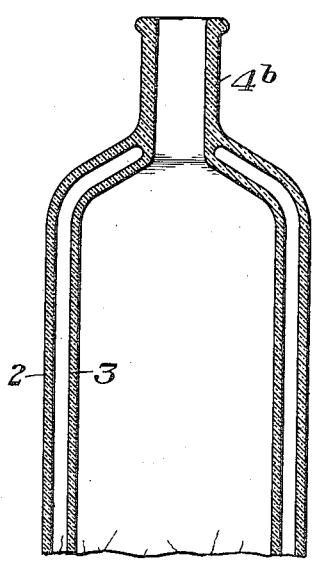
WITNESSES
R A Balderson
H M Corwin
INVENTOR
Clarence P. Byrnes
by Bakewell Byrnes & Parmelee
his atty's

UNITED STATES PATENT OFFICE.

CLARENCE P. BYRNES, OF SEWICKLEY, PENNSYLVANIA.

VACUUM-BOTTLE.

1,130,255.  Specification of Letters Patent.  Patented Mar. 2, 1915.

Original application filed May 12, 1908, Serial No. 432,372. Divided and this application filed May 15, 1912. Serial No. 697,485.

*To all whom it may concern:*

Be it known that I, CLARENCE P. BYRNES, of Sewickley, Allegheny county, Pennsylvania, have invented a new and useful Improvement in Vacuum-Bottles, of which the following is a full, clear, and exact description, reference being had to the accompanying drawings, forming part of this specification, in which—

Figure 1 is a vertical section showing one form of vacuum bottle constructed in accordance with my invention; and Figs. 2 and 3 are partial vertical sections showing modified forms of neck.

My invention relates to vacuum bottles, and is designed to provide a stronger and longer lived bottle, which will not require an inclosing and protective metallic case therefor.

This application is a division of my application Serial No. 432,372, filed May 12th, 1908, for method of forming glass vacuum receptacles.

Heretofore in the manufacture of vacuum bottles, the inner receptacle and the outer receptacle have been joined at the outer end of the mouth by a web of glass which is substantially of the thickness of either wall. This was considered desirable because of the small amount of heat transfer through this thin connecting web of glass between the inner and outer walls at the mouth. It was undesirable, however, in weakening the bottle and compelling the use of spacing devices between the walls which serve to support the inner bottle and keep it from sagging and breaking. It also led to the use of an outer metallic case to protect the fragile, delicate vacuum bottle itself.

In my improved bottle, I provide a solid glass neck, and thus make a much stronger and longer lived bottle, and one which does not require an outer metallic case. By solid neck I mean a neck in which the inner and outer walls are solid for a length at least very much greater than the thickness of either wall, and preferably having solid glass for a major portion of the length of the neck, if not the whole neck. I also provide a mold-formed and patterned outer wall for the bottle, this wall being preferably sufficiently heavy to stand ordinary use, as disclosed in the co-pending patent application 432,372, above referred to.

In the drawings, 2 represents the outer wall, 3 the inner wall, and 4 the neck portion of a vacuum bottle, which may be formed in one piece, as shown in my co-pending application Serial No. 432,372, or in separate pieces united together as desired. The neck portion 4 is solid from the outer surface to the inner surface for preferably the major portion of the length of the neck. Indeed, I prefer to make the entire neck of solid glass as distinguished from a neck having a vacuum recess extending through it with the glass merely united at the mouth end to the extent of the wall thickness.

In Fig. 1 I have shown an annular spacing device 5 between the walls at the bottom, but this may or may not be used as desired. 6 indicate the teats formed during the forming of the vacuum, and I have illustrated these as nested within a recess 7 at the bottom of the bottle. This protects these delicate parts from breakage, and I also intend to cover this feature.

In Figs. 2 and 3 I show the invention with different lengths and forms of neck, the neck being marked 4ª in Fig. 2 and 4ᵇ in Fig. 3.

The advantages of my invention results from the solid glass neck. The heavy glass of this neck makes the bottle strong and long-lived, and enables spacers to be done away with between the walls, if desired. The outer metallic case heretofore used may be done away with, and an all-glass one-piece bottle provided, the neck being formed either in one piece or of two pieces welded together, or otherwise formed to make a solid neck. Access for cleaning is greatly improved, and a highly attractive article afforded. By placing the vacuum forming projections within recesses, they are protected and the bottle further improved. The bottle is of uniform patterned shape, owing to its being mold-formed.

Changes may be made in the form, and size of the bottle, the methods of manufacture, &c., without departing from my invention.

I claim:—

1. As a new article of manufacture, a glass vacuum bottle having a solid glass neck and a mold-formed outer wall, said bottle having inner and outer walls spaced apart from each other to afford an annular vacuum space; substantially as described.

2. As a new article of manufacture, a glass vacuum bottle having two spaced apart walls with an annular vacuum space between them, said walls being united for a major portion of the length of the neck and the outer wall being mold-formed to a predetermined shape; substantially as described.

3. As a new article of manufacture, a glass vacuum bottle having spaced apart walls providing an annular vacuum space between them, said walls being integrally united at the neck for a length equal to several times the thickness of the wall, the outer wall being mold-formed to a predetermined shape; substantially as described.

4. As a new article of manufacture, an integral glass vacuum bottle having inner and outer walls spaced apart from each other to provide an annular vacuum space between them, the outer wall being mold-formed to a predetermined shape and the inner wall being supported against sagging by a relatively long solid glass connection at the neck with the outer wall; substantially as described.

5. As a new article of manufacture, a glass vacuum bottle having a solid glass neck and a mold-formed outer wall, said bottle having inner and outer walls spaced apart from each other to afford an annular vacuum space, said bottle having a vacuum teat within a recess of the outer wall to protect it; substantially as described.

In testimony whereof, I have hereunto set my hand.

C. P. BYRNES.

Witnesses:
G. M. VIERS,
H. M. CORWIN.